US012229067B2

(12) United States Patent
Olarig et al.

(10) Patent No.: US 12,229,067 B2
(45) Date of Patent: *Feb. 18, 2025

(54) MODULAR SYSTEM ARCHITECTURE FOR SUPPORTING MULTIPLE SOLID-STATE DRIVES (71) Applicant: Samsung Electronics Co., Ltd., Suwon-si (KR)

(72) Inventors: Sompong Paul Olarig, Pleasanton, CA (US); Fred Worley, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

This patent is subject to a terminal disclaimer.

(21) Appl. No.: 17/405,770

(22) Filed: Aug. 18, 2021

(65) Prior Publication Data

US 2021/0374085 A1 Dec. 2, 2021

Related U.S. Application Data (63) Continuation of application No. 16/844,689, filed on Apr. 9, 2020, now Pat. No. 11,119,963, which is a (Continued)

(51) Int. Cl.
G06F 13/40 (2006.01)
G06F 3/06 (2006.01)
(Continued)

(52) U.S. Cl.
CPC ...... *G06F 13/4022* (2013.01); *G06F 13/1668* (2013.01)

(58) Field of Classification Search
CPC ............. G09G 5/006; G09G 2370/042; H04N 21/436; G06F 13/4022; G06F 13/1668
(Continued)

(56) References Cited

U.S. PATENT DOCUMENTS 7,363,395 B2 4/2008 Seto
7,617,361 B2 11/2009 Hart
(Continued)

FOREIGN PATENT DOCUMENTS

CN 1902616 A 1/2007
CN 101047010 A 10/2007
(Continued)

OTHER PUBLICATIONS

Korean Notice of Allowance for KR Application No. 10-2018-0154805 dated Oct. 16, 2023, 7 pages.
(Continued)

*Primary Examiner* — Chun Kuan Lee
(74) *Attorney, Agent, or Firm* — Womble Bond Dickinson (US) LLP (57) ABSTRACT A rack-mountable data storage system includes: a chassis including one or more switchboards; a midplane interfacing with the one or more switchboards; and one or more data storage devices removably coupled to the midplane using a connector. At least one data storage device of the one or more data storage devices include a logic device to interface with the midplane. The logic device provides a device-specific interface of a corresponding data storage device with the midplane. The at least one data storage device is configured using the logic device according to a first protocol based on a signal on a pin of the connector, and the at least one data storage device is reconfigurable according to a second protocol based on a change of the signal on the pin of the connector using the logic device.

20 Claims, 6 Drawing Sheets

Related U.S. Application Data continuation of application No. 15/981,801, filed on May 16, 2018, now Pat. No. 10,649,940.

(60) Provisional application No. 62/638,722, filed on Mar. 5, 2018.

(51) Int. Cl.
  *G06F 13/16* (2006.01)
  *H04L 67/14* (2022.01)
  *H05K 7/18* (2006.01)

(58) Field of Classification Search
  USPC ........................................................ 710/306
  See application file for complete search history.

(56) References Cited

U.S. PATENT DOCUMENTS

| | | | |
|---|---|---|---|
| 8,219,750 | B2 | 7/2012 | Galloway et al. |
| 8,412,978 | B2 | 4/2013 | Flynn et al. |
| 8,966,476 | B2 | 2/2015 | Doan et al. |
| 9,389,790 | B2 | 7/2016 | Xu et al. |
| 9,501,110 | B2 | 11/2016 | Heyo et al. |
| 9,860,258 | B1* | 1/2018 | Collins .................. H04L 63/08 |
| 10,162,007 | B2 | 12/2018 | Chan et al. |
| 10,200,309 | B2 | 2/2019 | Worley et al. |
| 10,423,487 | B2 | 9/2019 | Marripudi et al. |
| 10,540,311 | B2 | 1/2020 | Olarig et al. |
| 10,565,150 | B2 | 2/2020 | So et al. |
| 10,593,421 | B2 | 3/2020 | Huang |
| 11,068,581 | B1* | 7/2021 | Beckett ................ G06F 21/604 |
| 2004/0073806 | A1 | 4/2004 | Zimmer |
| 2012/0144087 | A1 | 6/2012 | Buckland et al. |
| 2012/0278527 | A1 | 11/2012 | Cho et al. |
| 2015/0019918 | A1 | 1/2015 | Li |
| 2015/0120874 | A1 | 4/2015 | Kim et al. |
| 2015/0160690 | A1* | 6/2015 | Kagy ...................... H04L 49/00 |
| | | | 361/679.4 |
| 2015/0261272 | A1* | 9/2015 | Munjal ................ H05K 7/1492 |
| | | | 713/300 |
| 2016/0073544 | A1* | 3/2016 | Heyd ...................... G06F 1/185 |
| | | | 361/679.31 |
| 2016/0191665 | A1 | 6/2016 | Kang et al. |
| 2016/0239460 | A1 | 8/2016 | Ziakas et al. |
| 2017/0102895 | A1 | 4/2017 | Kim |
| 2017/0160784 | A1 | 6/2017 | Fuxa et al. |
| 2017/0168943 | A1 | 6/2017 | Chou et al. |
| 2017/0228328 | A1 | 8/2017 | Armstrong et al. |
| 2017/0277230 | A1 | 9/2017 | Samper et al. |
| 2017/0300445 | A1* | 10/2017 | McKnight ........... G06F 13/4068 |
| 2017/0364295 | A1 | 12/2017 | Sardinha et al. |
| 2018/0004695 | A1 | 1/2018 | Chu et al. |
| 2018/0032462 | A1 | 2/2018 | Olarig et al. |
| 2018/0032463 | A1* | 2/2018 | Olarig ................. G06F 13/4068 |
| 2018/0246833 | A1* | 8/2018 | Bai ....................... G06F 3/0617 |
| 2020/0233831 | A1 | 7/2020 | Olarig |

FOREIGN PATENT DOCUMENTS

| | | | |
|---|---|---|---|
| CN | 102047237 | A | 5/2011 |
| CN | 102077175 | A | 5/2011 |
| CN | 102124527 | A | 7/2011 |
| CN | 103699343 | A | 4/2014 |
| CN | 106873725 | A | 6/2017 |
| JP | 2008185907 | A | 8/2008 |
| JP | 2012-098875 | A | 5/2012 |
| JP | 2015-135697 | A | 7/2015 |
| JP | 2018018514 | A | 2/2018 |
| KR | 10-2016-0081851 | A | 7/2016 |
| KR | 10-2018-0012181 | A | 2/2018 |
| KR | 10-2018-0012190 | A | 2/2018 |
| KR | 10-2018-0012201 | A | 2/2018 |
| KR | 10-2018-0018262 | A | 2/2018 |
| KR | 10-2018-0020877 | A | 2/2018 |
| TW | I550629 | B | 9/2016 |
| TW | 201730892 | A | 9/2017 |
| TW | 201802690 | A | 1/2018 |

OTHER PUBLICATIONS

Chinese Office Action for CN Application No. 201910161270.3 dated Jan. 6, 2024, 10 pages.

Chinese Office Action dated Jun. 13, 2024, issued in corresponding Chinese Patent Application No. 201910161270.3, 10 pages.

* cited by examiner

MODULAR SYSTEM ARCHITECTURE FOR SUPPORTING MULTIPLE SOLID-STATE DRIVES

CROSS-REFERENCE TO RELATED APPLICATION(S)

This application is a continuation application of U.S. patent application Ser. No. 16/844,689 filed Apr. 9, 2020, which is a continuation application of U.S. patent application Ser. No. 15/981,801 filed May 16, 2018 (now issued to U.S. Pat. No. 10,649,940), which claims the benefits of and priority to U.S. Provisional Patent Application Ser. No. 62/638,722 filed Mar. 5, 2018, the disclosures of which are incorporated herein by reference in their entirety.

TECHNICAL FIELD

The present disclosure relates generally to data storage devices, more particularly, to a system and method for providing a modular system architecture for supporting multiple solid-state drives (SSDs).

BACKGROUND

An edge device provides entry points of network traffic generated by a variety of mobile devices into an enterprise or service provider core networks. Examples of an edge device include a router, a routing switch, a switch, an integrated access device, a multiplexer, and a variety of metropolitan area network (MAN) and wide area network (WAN) access points.

An edge device may translate between one type of network protocol and another protocol. In general, edge devices provide access to faster, more efficient backbone and core networks. Edge devices may also provide enhanced services, such as Virtual Private Network (VPN) support, Voice over IP (VoIP), and Quality of Service (QoS). An edge device may or may not modify the traffic it receives, depending on the function of the edge device and the communication protocol(s) of the incoming and outgoing traffic. For example, a simple switch routes the incoming traffic without making any modifications to the incoming packets, whereas a session border controller (SBC) may do some data conversions on the incoming packets before sending the modified packets.

As more and more data are generated from mobile devices, the amount of data transfer from those mobile devices to a datacenter dramatically increases year by year. An edge device may have a capability, i.e., edge computing, to pre-process local data generated by mobile devices or offloading workloads from a remote cloud to a base station. The edge computing capability of edge devices can make the data transfer between mobile devices and the enterprise of service network more efficient and cost-effective.

Data storage devices in a single chassis may be manufactured by different suppliers and need to be configured differently depending on their intended functions and target applications to run. It is highly desirable for a common system platform that can support different types of data storage devices from different suppliers. In addition, it is also desirable to have a common system platform that can support new emerging data storage devices such as New Form Factor 1 (NF1)-based SSDs.

SUMMARY

According to one embodiment, a rack-mountable data storage system includes: a chassis including one or more switchboards; a midplane interfacing with the one or more switchboards; and one or more data storage devices removably coupled to the midplane using a connector. At least one data storage device of the one or more data storage devices include a logic device to interface with the midplane. The logic device provides a device-specific interface of a corresponding data storage device with the midplane. The at least one data storage device is configured using the logic device according to a first protocol based on a signal on a pin of the connector, and the at least one data storage device is reconfigurable according to a second protocol based on a change of the signal on the pin of the connector using the logic device.

According to another embodiment, a programable logic device includes: a programable logic device includes: a register; one or more baseboard management board (BMC) multiplexers; and a slot multiplexer. The programable logic device is integrated in a midplane of a data storage system, and the midplane includes a drive bay including a plurality of connectors to insert one or more data storage devices. The programable logic device provides an interface to one or more BMCs of one or more switchboards using respective ones of the one or more BMC multiplexers to manage operation of the one or more data storage devices. Each of the one or more BMC multiplexers is connected to the slot multiplexer to enable BMCs of the one or more switchboards to simultaneously communicate with the one or more data storage devices. The programable logic device provides a device-specific interface to the one or more data storage devices according to a first protocol by allowing each of the one or more BMCs to access the register. The programable logic device is capable of reconfiguring at least one data storage device of the one or more data storage devices according to a second protocol based on a change of a pin of a connector of the plurality of the connectors corresponding to the at least one data storage device.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide system and method for providing a modular system architecture for supporting multiple solid-state drives. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes a common system platform that can support dissimilar non-volatile memory express (NVMe) over fabrics (NVMe-oF) devices made by different suppliers, and a multi-mode storage device that can be configured as an NVMe device or an NVMe-oF device. According to one embodiment, the present common system platform may refer to a rack-mountable chassis (or enclosure) including a midplane and one or more motherboards (in the case of NVMe devices) or one or more switchboards (in the case of NVMe-of devices) that can respectively accept a plurality of NVMe or NVMe-oF devices. The present common system platform can support an NVMe-oF device with a standard U.2 connector (e.g., PM1725a/1735 SSDs) as well as new emerging devices such as New Form Factor 1 (NF1)-based SSDs using an M.2 connector.

A multi-mode non-volatile memory express (NVMe) over fabrics (NVMe-oF) device can support either NVMe or NVMe-oF protocol by detecting information from a known location or a chassis type pin, for example, the pin E6 or a vendor-defined reserved pin of the U.2 connector depending on a chassis type that the multi-mode NVMe-oF device is inserted into. If the multi-mode NVMe-oF device is inserted to a drive bay of an NVMe chassis, all of the four peripheral component interconnect express (PCIe) lanes of the U.2 connector are driven by an embedded PCIe engine. In this case, the NVMe-oF device disables an embedded Ethernet engine, and all NVMe commands and functionalities are supported or enabled. On the other hand, if the multi-mode NVMe-oF device is inserted into a drive bay of an NVMe-oF chassis, the Ethernet ports of the NVMe-oF device are enabled and use as a data-plane. In this mode, the by-4 (×4) PCIe lanes are operated as two control planes as two by-2 (×2) PCIe lanes.

According to one embodiment, the midplane of the present common system platform can support both NVMe and NVMe-oF devices as well as the present multi-mode storage device that can be configured as either an NVMe device or an NVMe-oF device. When configured in the NVMe mode, the present multi-mode storage device behaves as an NVMe device, and when configured in the NVMe-oF mode, the present multi-mode storage device functions as an NVMe-oF device using SAS pins on the U.2 connector for one or more Ethernet ports.

According to one embodiment, the midplane of the present common system platform can support both a high availability (HA) (dual-port) mode and a non-HA mode (single-port). The mid-plane may be pre-routed with high-speed, clock, and control signals for supporting the HA mode where the two switchboards can communicate with each other via a Non-Transparent Bridge (NTB) of the two PCIe switches. In general, NVMe-oF devices that can support the HA mode can be more expensive. The present common system platform can offer economy of scales by supporting both HA and non-HA modes based on a system configuration and an application using the midplane that can support both the HA and non-HA modes. When configured in the non-HA mode, the present common system platform uses single by-2 (×2) PCIe lanes for all standard features as a control plane. When configured in the HA mode, the present common system platform splits the four PCIe lanes into two by-2 (×2) PCI lanes for port A and port B respectively. Ethernet signals use some SAS pins (e.g., S2, S3, S5 and S6) for the primary Ethernet port (e.g., Eth0) and other SAS pins (e.g., S9, S10, S12, and S13) for the secondary Ethernet port (e.g., Eth1). The pin E25 (DualPort_EN#) is used to enable dual port configuration. For example, when the pin E25 is asserted low, the NVMe-oF device operates in the dual port mode, otherwise, the NVMe-oF device operates in the single port mode. The two PCIe switches 106 are connected to each other via the respective NTB ports.

In the case of NVMe-oF, the switchboard of the present common system platform uses the two by-2 (×2) PCIe lanes as a control plane to communicate to each of the NVMe-oF devices attached to the chassis at no additional cost. The same midplane can be used for both an NVMe-based chassis or an NVMe-oF based chassis. Therefore, the present common system platform can provide faster time-to-market and lower development risks. The present common system platform can linearly scale the performance of a data storage system and provide more SSDs per Small Form Factor (SFF) per slot.

According to one embodiment, an existing PCIe driver can be used without modification to support the present common system platform and the present multi-mode storage device. In addition, the present common system platform can reuse motherboards or switchboards of various form factors such as 1U and 2U chassis.

The present common system platform can lower the cost of an edge device or a data storage server per a unit of a data storage devices because the same data storage device can be used as an NVMe device or an NVMe-oF device. In addition, the present multi-mode data storage device can be used in a variety of products and/or attached to a rack-mountable chassis in a datacenter.

According to one embodiment, the midplane of the present common system platform includes a complex programmable logic device (CPLD) that manages midplane operations. The CPLD communicates with the BMCs of the attached motherboards or switchboards via an I2C and/or SMBus. The BMC of each motherboard or switchboard can help to detect and coordinate the behaviors of different types of data storage devices attached thereto.

According to one embodiment, the midplane may not provide a computational support. Instead, an SSD interposer card (not shown) that is placed between the midplane and an SSD may contain a Field-Programmable Gate Array (FPGA) or Application-Specific Integrated Circuit (ASIC) to interface with the midplane to manage optimization of its own interfacing. For example, the SSD interposer card may manage the attached SSD with the midplane in coordination with the BMC.

The midplane of the present common system platform may include one or more edge SSD controller to which a plurality of SSDs can be plugged. The midplane can be configured to connect to the one or more edge SSD controllers to the motherboard or the switchboard of depending on the configuration of the system, for example, 1U and 2U chassis. Each one the multiple edge SSD controllers can directly interface with a plurality of SSDs, for example, 4 Ethernet SSDs (eSSDs). Each of the eSSDs may have its own lighter-weight ASIC and may have a small form factor, for example, compatible with the Next Generation Small Form Factor (NGSFF) or New Form Factor 1 (NF1) standard.

Figure 1A:
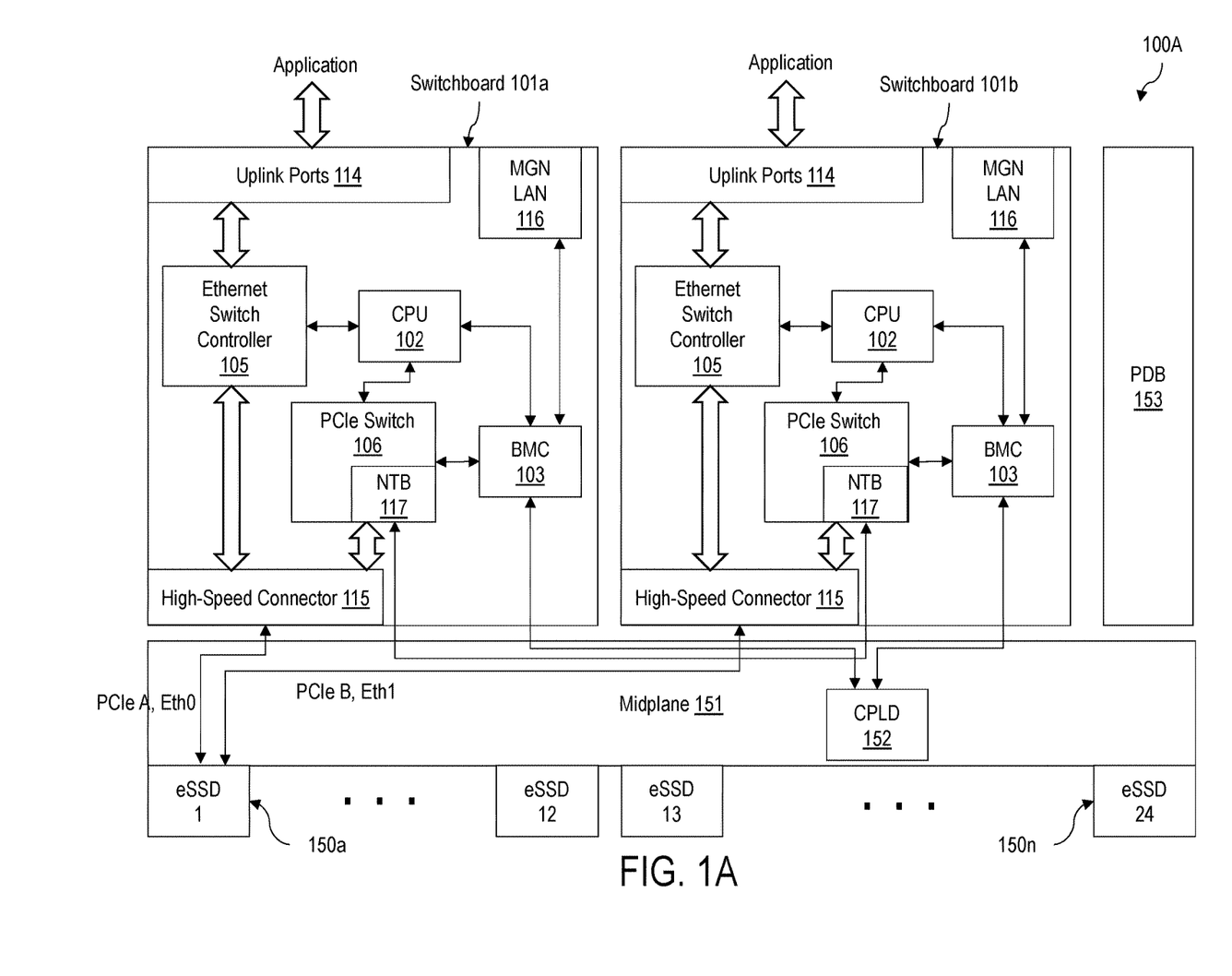
FIG. 1A shows a block diagram of an example data storage system implemented in a 2U chassis, according to one embodiment.

FIG. 1A shows a block diagram of an example data storage system implemented in a 2U chassis, according to one embodiment. The data storage system 100A includes two switchboards 101a and 101b that can be placed side-by-side in a 2U rack-mountable chassis. The two switchboards 101a and 101b may be identical except for their placement within the chassis. Depending on the system configuration, the data storage system 100A may include only one switchboard. In the following, the two switchboards 101a and 101b may be collectively or individually referred to as a switchboard 101.

Each of the switchboard 101a or 101b includes a central processing unit (CPU) 102, a baseboard management controller (BMC) 103, an Ethernet switch controller 105, a PCIe switch 106, a plurality of uplink ports 114 including Ethernet ports and PCIe ports, a high-speed connector 115 for interfacing with a plurality of data storage devices 150 (e.g., NVMe SSDs or Ethernet SSDs (eSSDs)) via a common midplane 151, and a management local area network (LAN) port 116. An example of the data storage system 150 is a PM1725a NVMe SSD designed and manufactured by Samsung Electronics, Co. Ltd. In the following, the terms, data storage device and eSSD, may be interchangeably used for the convenience of explanation in some embodiments; however, it is understood that the data storage device 150 can be any type of data storage devices, for example, an NVMe SSD, an Ethernet SSD, and a multi-mode SSD that can be configured to as an NVMe SSD or an NVMe-oF SSD.

The BMC 103 is a local service processor that can monitor the physical state of the corresponding switchboard 101 using various sensors, for example, a power status sensor (not shown) and a temperature sensor. The BMC 103 can communicate with a service administrator through an independent communication path such as the management LAN port 116 or a system management bus (SMBus) (not shown) using a portable device having a display.

The uplink ports 114 may connected to a host computer running an application, and the application running on the host computer may access the data storage devices 150 to store data and access the stored data via the uplink ports 114. When the data storage system 100A is an NVMe-oF system, the host computer can access the data storage devices 150 via a fabric network, such as Ethernet, Fibre Channel, and InfiniBand.

For example, each of the uplink ports is a 100 Gigabit Ethernet (Gbe) port. In the case of NVMe-oF, the host computer can send Ethernet packets to the switchboard 101 including commands to read, modify, and write data on the data storage devices 150. In the case of NVMe, the data storage device 150 is attached to a conventional X86-based motherboard (not shown).

The management LAN port 116 may be connected to an external management switch (not shown). The system administrator can monitor the status of multiple switchboards directly over the management LAN port 116 via the intelligent platform management interface (IPMI) protocol. The IPMI protocol allows communication between the system administrator and the BMC 103 over the management LAN port 116 using IPMI messages. The switchboard 101 may include other components, circuits and/or subsystems, for example, one or more dual data rate 4 (DDR4) dual in-line memory modules (DIMMs) to facilitate transfer of data to and from the data storage devices 150 and control and efficiently manage the data storage devices 150.

According to one embodiment, up to 24 data storage devices 150 can be coupled to each of the switchboards 101*a* and 101*b* of the data storage system 100A. Therefore, a total of 24 data storage devices 150 can be attached to the data storage system 100A. For example, the switchboard 101*a* is coupled to eSSD1 through eSSD24 via Ethernet port 0, and the switchboard 101*b* is coupled to eSSD1 through eSSD 24 via Ethernet port 1. Each eSSD can support up to 700 k input/output operations per second (IOPs). The estimated performance of the data storage system 100A is about 16.8 million IOPs (24 times 700 k IOPS per each eSSD) for random read input/output (I/O).

Each of the eSSD1 through eSSD 24 can be configured to operate in an NVMe mode or an NVMe-oF mode. For example, the data storage device 150 is an NVMe-oF device (or eSSD) that is configured to operate in an NVMe-oF mode. In this case, two of the four PCIe lanes (2×PCIe) are configured to connect to the high-speed connector 115 of the first switchboard 101*a*, and the remaining two PCIe lanes are configured to connect to the high-speed connector 115 of the second switchboard 101*b*. Similarly, the first Ethernet port (Eth0) is configured to connected to the high-speed connector 115 of the first switchboard 101*a*, and the second Ethernet port (Eth1) is configured to connect to the high-speed connector 115 of the second switchboard 101*b*. Ethernet and PCIe traffic sent to and received from each of the data storage devices 150 are routed through the Ethernet switch controller 105 and the PCIe switch 106 respectively.

According to one embodiment, the midplane 151 includes a complex programmable logic device (CPLD) 152 that manages midplane operations. The CPLD 152 communicates with the BMCs 103 of the attached switchboards 101. The CPLD 152 and the BMC 103 of each switchboard 101 can help to detect and coordinate the behaviors of different types of data storage devices 150 attached to the chassis. For example, the CPLD 152 detects presence/absence of a data storage device 150 in each slot by measuring a voltage on a specific pin corresponding to the data storage device 150 on the high-speed connector 115.

The CPLD 152 can provide various supports for the BMC 103 to manage the data storage devices 150. For example, the CPLD 152 connects the BMC 103 to the attached data storage devices 150 (up to 24 in the data storage system 100A) via a dedicated SMBus and/or I2C port. The CPLD 152 may allow the BMC 103 to communicate with each data storage device 150 one at a time due to the limitation that each data storage device 150 has the same sensor address. The data storage device 150 may be attached to a respective drive slot of the chassis that supports drives having a 2.5" small form factor. The CPLD 152 may also supply an I2C port connected to the BMC 103 to supply reliable I2C communication with a protection mechanism to enable power on/off each group of data storage devices 150 (e.g., four data storage devices 150). The CPLD 152 can further illuminate an indicator light (e.g., drive fault LED) on the midplane 151 of up to 24 data storage devices 150 by accessing information on the power supply unit (PSU) via the PM Bus (if available) and reset a logic control and a power-on/down timing control.

According to one embodiment, the data storage system 100A includes a power distribution board (PDB) 153. The power distribution board 153 may include a redundant power supply unit (PSU) that supplies power (e.g., 12V) to a hot swap controller (not shown) of each of the switchboards 101*a* and 101*b*. The host swap controller allows a data storage device 150 to be attached or detached from the chassis without powering off the switchboards 101.

Figure 1B:
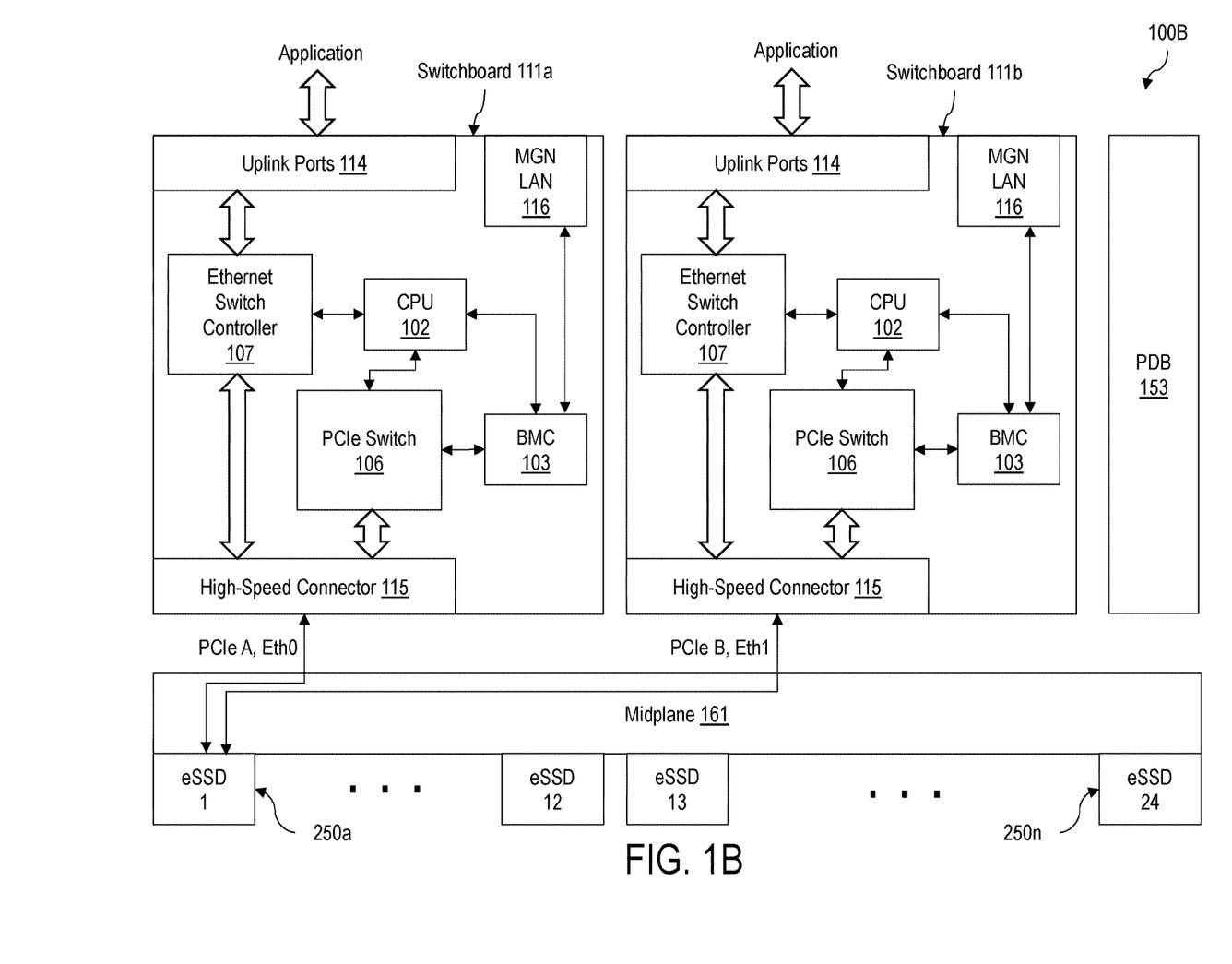
FIG. 1B shows a block diagram of an example data storage system implemented in a 2U chassis, according to another embedment.

FIG. 1B shows a block diagram of an example data storage system implemented in a 2U chassis, according to another embedment. The data storage system 100B is includes one or two switchboards 111*a* and 111*b*, a power distribution board 153, and a midplane 161. When the data storage system 100B includes two switchboards 111*a* and 111*b*, the two switchboards 111*a* and 111*b* may be identical except for their placement within the chassis. Depending on the system configuration, the data storage system 100B may include only one switchboard. In the following, the two switchboards 111*a* and 111*b* may be collectively or individually referred to as a switchboard 111.

Similar to the data storage system 100A of FIG. 1A, the data storage system 100B is enclosed in a 2U chassis and includes two switchboards 111*a* and 111*b*. The data storage system 100B may include a different type of Ethernet switch controller 107 and a drive bay of the midplane 161 for accepting data storage devices 250 that has a form factor that is different from that of the data storage device 150 of the data storage system 100A. The data storage devices 150 and 250 may use the same M.2 connector.

Due to the architectural difference, an SSD controller included in the midplane 161 for interfacing with data storage devices 250 may have a different configuration and design compared to the SSD controller included in the midplane 151 of the data storage system 100A. For example, the Ethernet switch controller 107 included in the switchboard 111 of the data storage system 100B is a Trident series switchboard designed and manufactured by Broadcom whereas the Ethernet switch controller 105 included in the switchboard 101 of the data storage system 100A shown in FIG. 1A is a Tomahawk series switchboard designed and manufactured by Broadcom. The cost of the data storage system 100B may be comparable to or less than the cost of the data storage system 100A because the Ethernet switch controller 107 included in the switchboard 111 of the data storage system 100B is cheaper than the Ethernet switch controller 107 included in the switchboard 111 of the data storage system 100A; however, it can have buffers of a larger size that are more suitable for a storage application than a networking application. In addition, the IOPS performance of the data storage system 100B may be the same as or better than the IOPS performance of the data storage system 100A due to the increased number of data storage devices 150 (e.g., 48 data storage devices 250 in the data storage system 100B vs. 24 data storage devices 150 in the data storage system 100A) that can be accessed simultaneously and independently even if the individual IOPS performance of the data storage device 250 (e.g., 550 k IOPS) in the data storage system 100B may be lower than the IOPS performance of the data storage device 150 (e.g., 700 k IOPS) in the data storage system 100A.

According to one embodiment, the data storage device 250 included in the data storage system 100B may have one or more NGSFF form factor SSDs (herein also referred to as NF1 SSDs). In some embodiments, the NGSFF or NF1 form factor may also be referred to as M.3 form factor. An NF1 SSD uses an M.2 connector but has a form factor to accommodate a wider printed circuit board (PCB) to provide more room for additional circuits (e.g., FPGA or ASIC) and/or NAND packages. For example, the NF1 SSD has a width of 30.5 mm and a length of 110 mm. In contrast, standard M.2 modules are available in various widths (e.g., 12, 16, 22, and 30 mm) and lengths (e.g., 16, 26, 30, 38, 42, 60, 80, and 110 mm). In one embodiment, each data storage device 250 can accommodate two SSDs so that the maximum number of SSDs that can be attached to the data storage device 100B and accessed simultaneously and independently is 48. In comparison, the data storage device 150 of the data storage system 100A shown in FIG. 1A may have only one SSD, and the maximum number of SSDs that can be attached to the data storage device 100A is 24.

According to one embodiment, the Ethernet switch controller 107 of the switchboard 111a or 111b may be replaced with an Ethernet repeater or a re-timer. The repeater included in the Ethernet switch controller 107 may provide an active pass-through of Ethernet signals between the uplink ports 114 and the downlink ports to the data storage devices 250 via the high-speed connector 115. For example, the repeater of the first switchboard 111a can actively pass through (i.e., amplifying signals for a long-range signal transmission) Ethernet signals of port 0's for not only the eSSDs 1-24 that are attached to the first switchboard 111a but also the Ethernet port 1's of eSSDs 1-24 that are attached to the second switchboard 111b via the midplane 161. Similarly, the repeater of the second switchboard 111b can actively pass through Ethernet signals port 1's for not only the eSSDs 1-24 that are attached to the second switchboard 111b but also the Ethernet port 0's of eSSDs 1-24 that are attached to the first switchboard 111a via the midplane 161.

In the HA mode, the PCIe switch 106 of the switchboard 111a can use the two PCIe lanes 0 and 1 of the U.2 connector of the attached eSSDs as a control plane for the first Ethernet port (Ethernet Port 0). The first pair of the SAS port 0 may be used for the first Ethernet. The PCIe switch 106 of the switchboard 111a or 111b can communicate with PCIe Port A of all the eSSDs 1-24. Similarly, the PCIe switch 106 of the switchboard 111b can use the two PCIe lanes 2 and 3 of the U.2 connector of the attached eSSDs as a control plane for the second Ethernet port. The second pair of the SAS port 1 is used for the second Ethernet port (e.g., Ethernet Port 1). The PCIe switch 106 of the switchboard 111b can communicate with the PCIe Port 1 of all eSSDs 1-24.

Each of the attached eSSDs can provide some device-specific information to the BMC 103 via the PCIe switch 106 over the control plane established between the PCIe switch 106 and the eSSD. Examples of such device-specific information that can be carried over the control plane include, but are not limited to, discovery information and FRU information of the eSSD.

The midplane 161 may be the same midplane used in the data storage system 100A of FIG. 1A. However, the data storage system 100B can accommodate one or more NF1 SSDs (e.g., the data storage device 250 including two SSDs) that can be simultaneously and independently accessed compared to the data storage system 100A including only one SSD (e.g., the data storage device 150 including one PM1725a SSD). The maximum I/O performance of each of the SSDs included in the data storage device 250 is 550 k IOPs. In this case, the expected maximum I/O performance of the data storage system 100B is 24.5 million IOPs (48 times 550 k IOPs per each SSD). According to one embodiment, the data storage system 100B can also accommodate one or more data storage devices 150 having one SSD. In other words, the data storage device 150 of FIG. 1A is backward compatible with the data storage system 100B (having the M.2 connector), but a new control logic design may be required to have the data storage device 250 shown in FIG. 1B to function properly in the data storage system 100A of FIG. 1A. The new control logic may be implemented in an SSD interposer card or internally to the data storage device 250 (e.g., control logic device 351 of FIG. 3). A single SSD requires a single PCIe root port (RP). The two SSDs in the data storage device 250 would require two PCIe root ports, and they need to be implemented by the new control logic. In this case, the maximum performance of the data storage system 100B may be increased to 33.6 million maximum IOPS (i.e., 48 eSSD 250, and 700 k IOPs per each of the two SSDs in the eSSD 250) from 26.4 million maximum IOPs (i.e., 24 eSSD 250, and 550 k IOPs per each of the two SSDs in the eSSD 250). Depending on the system configuration and a target cost, different I/O performance can be achieved by choosing different data storage systems and different data storage devices.

Figure 2:
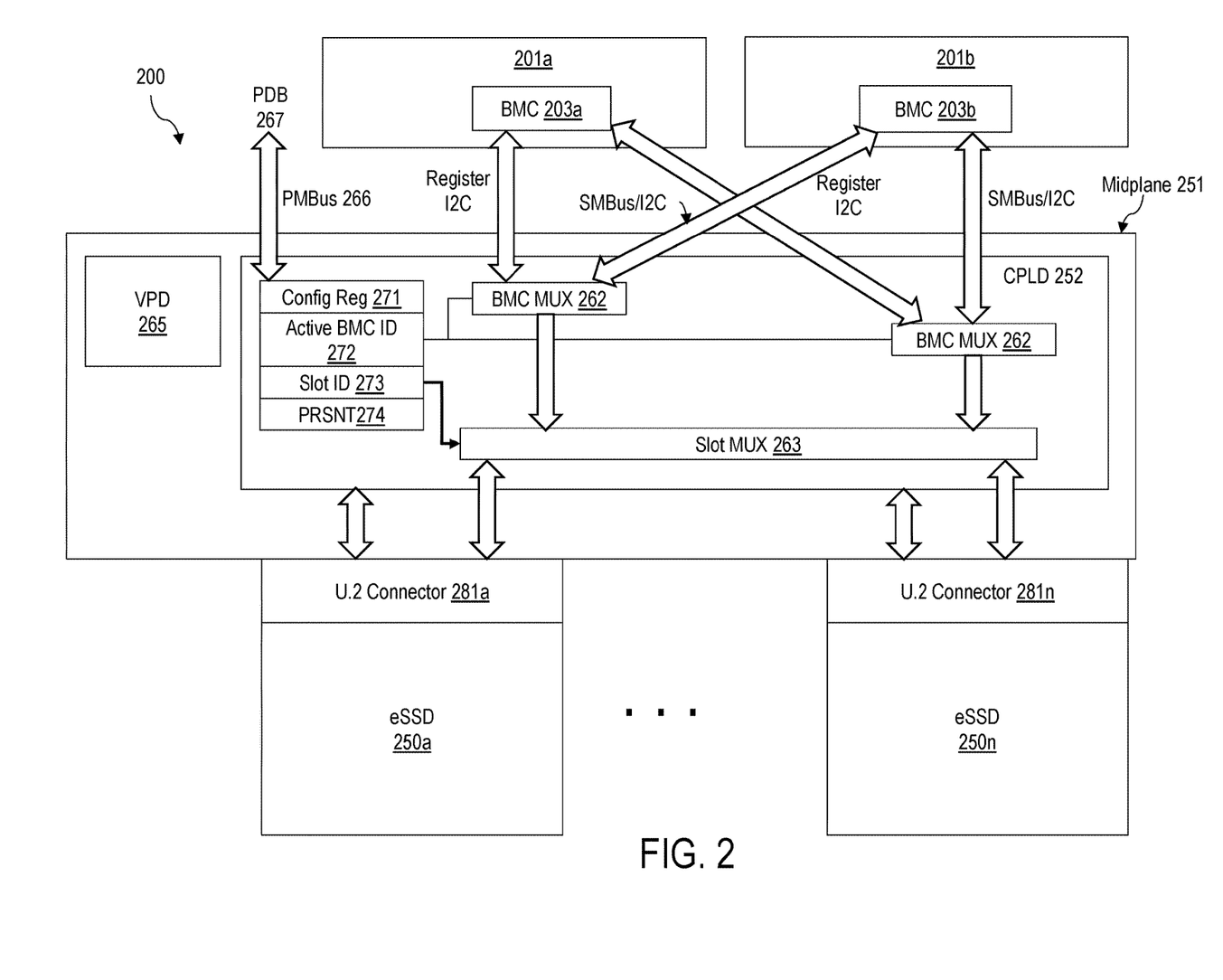
FIG. 2 shows a block diagram of an example CPLD included in a midplane of a data storage system, according to one embodiment.

FIG. 2 shows a block diagram of an example CPLD included in a midplane of a data storage system, according to one embodiment. The data storage system 200 includes two switchboards 201a and 201b, a midplane 251, and a plurality of data storage devices 250 attached to the midplane 251 via a respective connector 281 (e.g., U.2 connector, M.2 connector). The power distribution board (PDB) 267 can access the register of the CPLD 252 via the PMBus 266. The I2C or slot multiplexer 263 is used to enable the BMC 203 to communicate with each eSSD 250 once at a time. The BMC multiplexer 262 is used when more than one BMCs 203 are present in the system. Each of the switchboards 201 has a BMC 203 and other components (not shown) as described with respect to the data storage system 100A and 100B shown in FIGS. 1A and 1B. For the convenience of illustration, FIG. 2 shows only the BMC 203 in the switchboard 201. The midplane 251 includes a CPLD 252 and a vital product data (VPD) 265 that may be stored in an electrically erasable programmable read-only memory (EEPROM) chip. The VPD 265 may contain a product-specific data that is set by a manufacturer of the switchboard 201.

When the two switchboards 201a and 201b are placed side-by-side (e.g., FIG. 1A) instead of on-top of each other (e.g., FIG. 1B), there may not be a sufficient physical space to place a connector having a number of interface pins between each of the switchboards 201 and the midplane 251 due to an interface area between each of the switchboards 201 and the midplane 251 is reduced by half.

The BMC 203 can access a register space of the CPLD 252 to set configuration, read a status, or execute actions on each of the attached eSSDs 250. The register of the CPLD 252 includes, but is not limited to, a configuration register 271, an active BMC ID 272, a slot ID 273, and a present (PRSNT) register 274. The active BMC ID 272 refers to the identifier of an active BMC among the BMCs 203a and 203b of the two switchboards 201a and 201b. The slot ID 273 refers to an identifier to each of the drive slots of the data storage system, for example, 1-24. The present register 274 refers to a status of presence/absence of each eSSD 250 in the corresponding slot as identified by the slot ID 273.

After the system boots or resets, the CPLD 252 designates the BMC 203a on the first switchboard 201a as an active BMC by default by the CPLD 252 regardless of the second switchboard 201b is present or not in the chassis. If the active BMC 203a powers down or fails, the other BMC 203b can take the role of the active BMC. When the default BMC 203a recovers from a failure, the BMC 203a can take over the active role from the BMC 203b.

The active BMC can configure a respective eSSD 250 by reading or writing a register status with a specified proper slot ID 273 to have a SMBus/I2C connection between the active BMC and the target eSSD 250. After connection is established, the BMC 203 can send a command to the sensor address of the target eSSD 250. The BMC 203 can also read drive and slot status registers and execute intended actions on the target eSSD 250.

Figure 3:
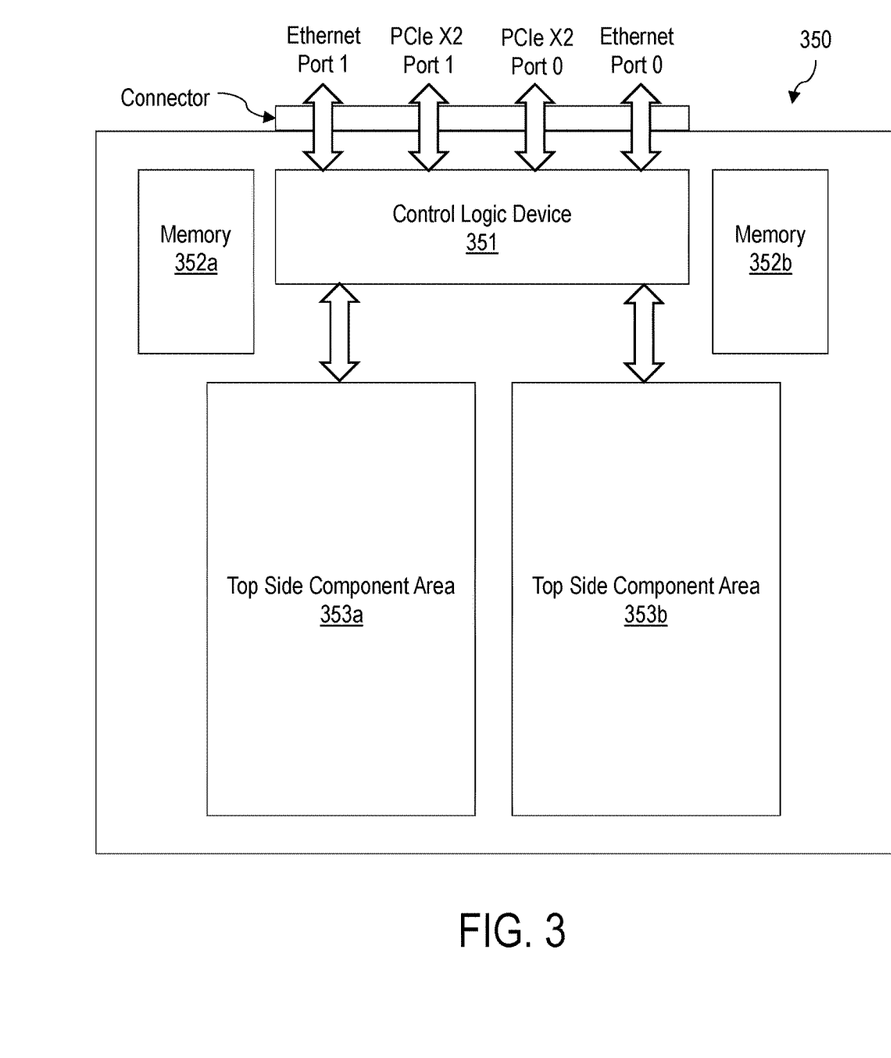
FIG. 3 shows an example data storage device including two small form factor SSDs, according to one embodiment.

FIG. 3 shows an example data storage device including two small form factor SSDs, according to one embodiment. The data storage device 350 includes a control logic device 351 (e.g., FPGA or ASIC), two top side component areas 353a and 353b for providing a surface area of a respective SSD (e.g., an NF1 SSD), and memories 352a and 352b coupled to each of a processor subsystem (PS) and a programmable logic (PL) of the control logic device 351, respectively. The control logic device 351 may be placed on one side of the PCB of the data storage device 350 along with other components, for example, voltage regulator an I2C switch. The control logic device 351 may communicate with the PCIe switch (e.g., the PCIe switch 106) on the switchboard 101 of FIG. 1B via the connector (e.g., U.2 connector, M.2 connector) and configure and operate the two small form factor SSDs included in the data storage device 350 accordingly. According to one embodiment, the data storage device 350 can be configured to operate in a HA mode or a non-HA mode. If the PCIe RP detects two ×4 devices or the DualPort_En # pin asserted, the PCIe EP #2 and Ethernet ports are enabled. In addition, the data storage device 350 is hot swappable as the data storage device 150 of FIG. 1A. In FIG. 3, the block layout of the data storage device 350 shown shows that the top side component areas 353 of the respective SSDs are placed apart from the control logic device 351 and the memories 353 (and other components). However, in a physical layout, the top side component areas 353 of the two SSDs included in the data storage device 350 may partially or entirely overlap the area of the control logic device 351 to reduce the footprint of the data storage device 350.

According to one embodiment, the control logic device 351 provides power-loss protection. During a normal power-off period, the host computer allocates a time to preserve data integrity by transmitting a standby command to the data storage device 350. In an event of an unexpected power loss, cached data in internal buffers (e.g., DRAM) of the data storage device 350 can be lost. The loss of the cached data may occur with an unexpected power outage as well as when a user unplugs the data storage device 350 from the chassis. The control logic device 351 can prevent data loss resulting from an unexpected power shutdown. Upon detection of a failure or a hot swap, the SSDs included in the data storage device 350 immediately use stored energy therein (e.g., a tantalum capacitor) to provide sufficient time to transfer the cached data in the buffer to the flash memory, ensuring no loss of data. The timing and latency of the data transfer from the buffer the flash memory for power loss protection may be varied depending on the type of the data storage device 350.

Figure 4:
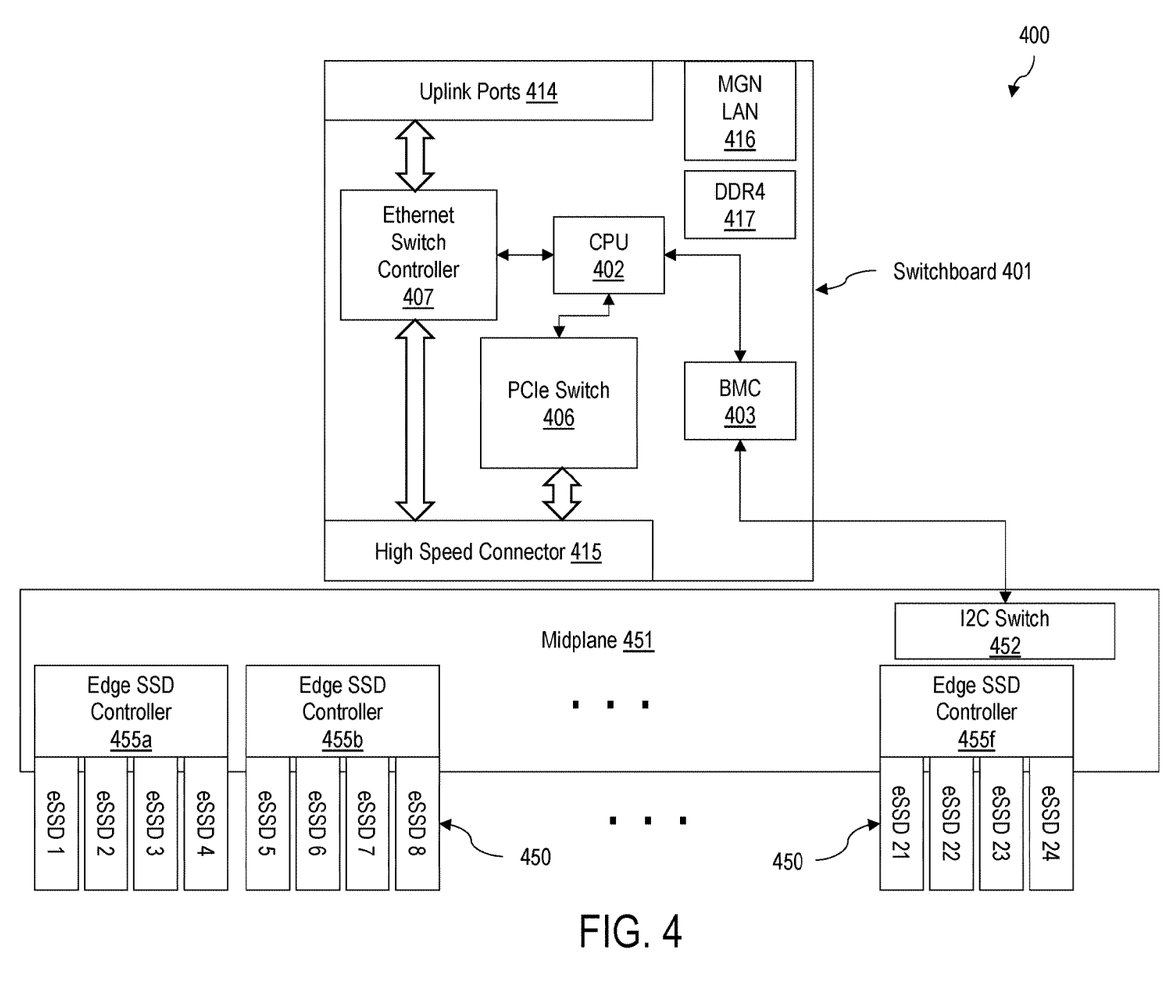
FIG. 4 shows a block diagram of an example data storage system implemented in a 1U chassis, according to one embodiment.

FIG. 4 shows a block diagram of an example data storage system implemented in a 1U chassis, according to one embodiment. The 1U chassis may include a switchboard 401 and a midplane 451. The switchboard 401 may include a CPU 402 (e.g., an X86 processor), a BMC 403, a PCIe switch 406, an Ethernet switch controller 407, management LAN port 416, uplink ports 414, and a high speed connector 415 to interface with one or more eSSDs 450 via the midplane 451. The switchboard 401 may be the same as the switchboard 111a or 111b of FIG. 1B. The same switchboard 111a or 111b of FIG. 1B may be reused but the midplane 451 may need a new control logic (e.g., FPGA and ASIC) to function in the 1U chassis.

According to one embodiment, the midplane 451 includes one or more edge SSD controller 455. Each edge SSD controller 455 can support and control up to four data storage devices 450 (e.g., eSSDs).

According to one embodiment, the midplane 451 includes an I2C switch 452 that is configured to provide communication with a protection mechanism for the BMC 403 to power on/off the attached data storage devices 450. The BMC 403 may communicate with each data storage device 450 one at a time due to the limitation that the data storage devices 450 in each group have the same sensor address. The data storage device 450 having an NF1 form factor may be attached to a respective drive slot of the edge SSD controller. Each edge SSD controller 455 may power on/off the coupled group of four data storage devices 450.

Figure 5:
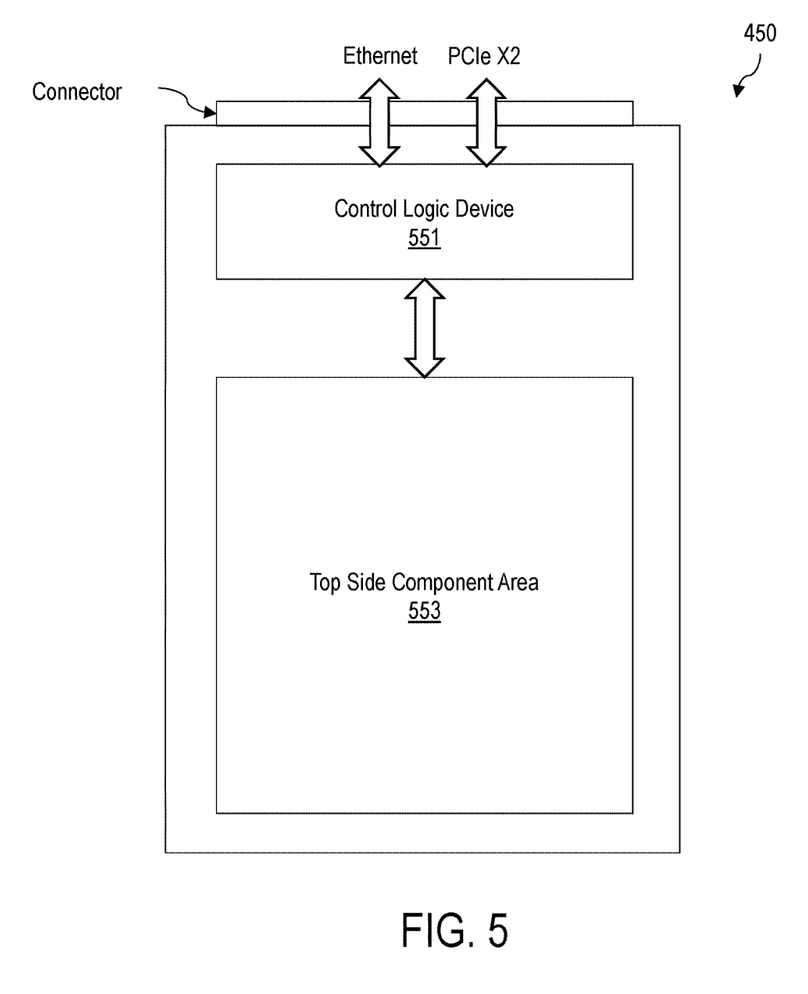
FIG. 5 shows an example data storage device used in the data storage system of FIG. 4, according to one embodiment.

FIG. 5 shows an example data storage device used in the data storage system 400 of FIG. 4, according to one embodiment. The data storage device 450 may have an NF1 form factor (also referred to as an M.3 form factor or an NGSFF) that is adequate to be attached to an edge SSD controller 455 of FIG. 4 via a connector (e.g., U.2 connector, M.2 connector). The data storage device 450 includes a control logic device 551 (e.g., ASIC) that is configured to communicate with one or more flash devices (e.g., SSDs) mounted on a top side component area 553.

According to one embodiment, a rack-mountable data storage system includes: a chassis including one or more switchboards; a midplane interfacing with the one or more switchboards; and one or more data storage devices removably coupled to the midplane using a connector. At least one data storage device of the one or more data storage devices include a logic device to interface with the midplane. The logic device provides a device-specific interface of a corresponding data storage device with the midplane. The at least one data storage device is configured using the logic device according to a first protocol based on a signal on a pin of the connector, and the at least one data storage device is reconfigurable according to a second protocol based on a change of the signal on the pin of the connector using the logic device.

The logic device may be a field-programmable gate array (FPGA) or an application-specific integrated circuit (ASIC).

The connector may be a U.2 connector.

The connector may be a M.2 connector.

The one or more data storage devices may include at least one new form factor 1 (NF1) solid-state drive (SSD) compatible with a new form factor 1 (NF1) standard.

The one or more data storage devices may include at least one NVMe SSD and NVMe-of SSD.

The pin may be a vendor-defined reserved pin of the connector.

The chassis may be a 2U chassis, and the rack-mountable data storage system may include a first switchboard and a second switchboard that are placed on top of each other in the 2U chassis.

The midplane may have a drive bay to insert 24 SSDs.

The rack-mountable data storage system may include a single switchboard in a 1U chassis.

The rack-mountable data storage system may include a first switchboard and a second switchboard that are placed side by side in a 2U chassis.

The midplane may include a programmable logic device for detecting presence of the one or more data storage devices and providing an interface to a baseboard management board (BMC) of the one or more switchboards to manage operation of the one or more data storage devices.

The midplane may have a drive bay to insert 48 SSDs.

The midplane may configure the one or more data storage devices are configurable to operate in a high-availability (HA) mode or a non-HA mode.

According to another embodiment, a programable logic device includes: a programable logic device includes: a register; one or more baseboard management board (BMC) multiplexers; and a slot multiplexer. The programable logic device is integrated in a midplane of a data storage system, and the midplane includes a drive bay including a plurality of connectors to insert one or more data storage devices. The programable logic device provides an interface to one or more BMCs of one or more switchboards using respective ones of the one or more BMC multiplexers to manage operation of the one or more data storage devices. Each of the one or more BMC multiplexers is connected to the slot multiplexer to enable BMCs of the one or more switchboards to simultaneously communicate with the one or more data storage devices. The programable logic device provides a device-specific interface to the one or more data storage devices according to a first protocol by allowing each of the one or more BMCs to access the register. The programable logic device is capable of reconfiguring at least one data storage device of the one or more data storage devices according to a second protocol based on a change of a pin of a connector of the plurality of the connectors corresponding to the at least one data storage device.

The programmable logic device may interface with one or more switchboards of the data storage system.

The programmable logic device may be a field-programmable gate array (FPGA).

The register may include a configuration register, an active BMC ID, a slot ID, and a present register.

The pin may be a vendor-defined reserved pin of the connector.

The above example embodiments have been described hereinabove to illustrate various embodiments of implementing a system and method for providing a modular system architecture for supporting multiple solid-state drives. Various modifications and departures from the disclosed example embodiments will occur to those having ordinary skill in the art. The subject matter that is intended to be within the scope of the invention is set forth in the following claims.

What is claimed is:

1. A storage system comprising:
a midplane; and
a data storage device coupled to the midplane via a connector,
wherein the data storage device is configured according to a first protocol based on a first signal on a pin of the connector, the first signal causing an ethernet port of the data storage device to change from a first status to a second status, and
wherein the data storage device is reconfigurable according to a second protocol based on a second signal on the pin of the connector.

2. The storage system of claim 1, wherein the data storage device comprises a processor, a field-programmable gate array (FPGA), or an application-specific integrated circuit (ASIC).

3. The storage system of claim 1, wherein the connector is capable of supporting a peripheral component interconnect express (PCIe) protocol.

4. The storage system of claim 1, wherein the connector is at least one of a U.2 connector or a M.2 connector.

5. The storage system of claim 1, wherein the data storage device is compatible with a new form factor 1 (NF1) standard.

6. The storage system of claim 1, wherein the data storage device includes at least one of a non-volatile memory express (NVMe) solid-state drive (SSD) and an NVMe over fabrics (NVMe-oF) SSD.

7. The storage system of claim 1, wherein the connector comprises a pin that is a vendor-defined reserved pin.

8. The storage system of claim 1 further comprising a 2U chassis,
wherein the storage system includes a first switchboard and a second switchboard that are placed on top of each other in the 2U chassis.

9. The storage system of claim 1, wherein the midplane has a drive bay to insert a predetermined number of data storage devices.

10. The storage system of claim 1 further comprising a 1U chassis that includes a switchboard.

11. The storage system of claim 1 further comprising a 2U chassis,
wherein a first switchboard and a second switchboard that are placed side by side in the 2U chassis.

12. The storage system of claim 11, wherein the midplane includes a device for detecting a presence of the data storage device and providing an interface to one of a processor, a controller, or a baseboard management board (BMC) of either the first switchboard or the second switchboard to manage operation of the data storage device.

13. The storage system of claim 1, wherein the midplane configures the data storage device to operate in a high-availability (HA) mode.

14. The storage system of claim 1, wherein:
the first status comprises being enabled for data transfer; and
the second status comprises being disabled for data transfer.

15. A logic device comprising:
a register;
a baseboard management board (BMC) multiplexer; and
a slot multiplexer,
wherein the logic device is integrated in a midplane of a data storage system, and the midplane includes a drive bay including a connector to insert a data storage device,
wherein the logic device provides an interface to a BMC of a switchboard using the BMC multiplexer to manage operation of the data storage device,
wherein the BMC multiplexer is connected to the slot multiplexer to enable the BMC of the switchboard to communicate with the data storage device,
wherein the logic device provides an interface to the data storage device according to a first protocol based on a first signal on a pin of the connector by allowing the BMC to access the register, the first signal causing an ethernet port of the data storage device to change from a first status to a second status, and
wherein the logic device is capable of reconfiguring the data storage device according to a second protocol based on a second signal on the pin of the connector.

16. The logic device of claim 15, wherein the logic device interfaces with the switchboard of the data storage system.

17. The logic device of claim 15, wherein the logic device is a field-programmable gate array (FPGA).

18. The logic device of claim 15, wherein the register includes a configuration register, an active BMC ID, a slot ID, and a present register.

19. The logic device of claim 15, wherein the connector comprises a pin that is a vendor-defined reserved pin.

20. The logic device of claim 15, wherein:
the first status comprises being enabled for data transfer; and
the second status comprises being disabled for data transfer.

\* \* \* \* \*